Patented June 20, 1939

2,163,516

UNITED STATES PATENT OFFICE 2,163,516

ZINC SULPHIDE AS A CERAMIC OPACIFIER

Raymond William Hannagen, Cardiff, Wales

No Drawing. Application May 1, 1936, Serial No. 77,453. In Great Britain May 1, 1935

8 Claims. (Cl. 106—36.2)

In the manufacture of opaque glazes, enamels, engobe glass or the like, a known opacifier is zinc sulphide, preferably added to the batch or in the operation of milling the frit or both to the batch and to the mill.

This invention is based on the observation that the effect of zinc sulphide is improved, both in producing a whiter glaze or enamel and in respect of the firing properties of the glaze, by the presence of zinc oxide, and the invention consists in improving the production of opaque glazes, enamels or the like by introducing zinc oxide into the glaze at some stage of its manufacture or application.

The obvious method of introducing the zinc oxide into the glaze is by mixing the compound itself with the constituents of the batch, or, preferably, adding it to the mill during the grinding of the frit made from the batch. However, it is also possible to introduce into the batch or milled frit a product which will yield zinc oxide during the smelting of the bath or the firing of the glaze, for instance zinc carbonate or zinc acetate; of course, in this case care must be taken that the decomposition or reaction which produces the zinc oxide in the glaze has no deleterious effect on the glaze.

The proportion of zinc oxide to zinc sulphide which gives the best result must be ascertained by trial, since it varies with the type of glaze that is to be produced and with the type of clay used for floating the glaze. The main result to be sought is maximum whiteness of the finished glaze, but in some cases this is only attainable with loss of capacity, so that the proportion of zinc oxide may be better selected slightly below that which produces maximum whiteness. Other opacifiers, including the so-called "gas opacifiers" may be simultaneously used with advantage to produce maximum opacity and whiteness.

The following is an example of the production of a white opaque enamel on metal hollow-ware, in accordance with the invention:

A batch consisting, in parts by weight of:

| | |
|---|---|
| Borax | 360 |
| Felspar | 448 |
| Quartz | 280 |
| Soda ash | 112 |
| Sodium silicofluoride | 112 |
| Fluorspar | 60 | is mixed with 30 parts of zinc oxide and the mixture is smelted until the smelt is quiet; the mass is then quenched with water. The frit thus produced is dried and milled with, per 100 parts, 10 parts of white clay, 6 parts of zinc sulphide, 7 parts of zinc oxide and 45–50 parts of water, and further milled to a suitable grade of fineness. Other additions, for example sodium nitrite amounting to 1 per cent. of the weight of the frit, may be made to improve further the whiteness or setting properties, or both, of the enamel. The enamel is applied and fired in the usual manner.

An alternative procedure is to add part or all of the zinc sulphide to the batch before smelting and to add the desired quantities of zinc oxide as described above. The zinc sulphide may be formed by using an alkali sulphide and a suitable zinc compound as constituents of the batch or as additions to the mill.

It is not at present known whether the zinc oxide added to or produced in the glaze remains as such in the finished glaze.

The term "zinc sulphide" as employed in the specification and appended claims is understood to apply to ordinary zinc sulphide and does not embrace the so called "luminescent" sulphides of zinc which have undergone a special treatment and contain excitants which render the substance self-luminous.

Having thus fully described the nature of my said invention and the best means I know of carrying the same into practical effect, I declare that what I claim is:

1. The improvement in the production of glazes, enamels or the like which contain ordinary zinc sulphide as an opacifier, which consists in introducing zinc oxide into the glaze at some stage of its manufacture or application.

2. A manufacture of an opaque glaze or enamel for application to ceramic ware or metal-ware, wherein zinc oxide is used to improve the whiteness of the opacity in the finished glaze due to ordinary zinc sulphide.

3. A batch which is to be used for producing a glaze that has opacity due to ordinary zinc sulphide, characterised by containing zinc oxide or a product which will yield zinc oxide during the smelting of the batch or the firing of the glaze.

4. A frit for producing on ceramic ware or metal ware a glaze which has opacity due to ordinary zinc sulphide, characterised by containing zinc oxide or a product which will yield zinc oxide during the firing of the glaze.

5. Articles glazed with a glaze made from the batch defined in claim 3.

6. Articles glazed with a glaze made from the frit defined in claim 4.

7. In the manufacture of an opaque glaze or enamel, the steps of producing a frit containing zinc oxide as one of the components by smelting the various components, treating the smelt so as to produce a frit, drying the frit, grinding the frit and introducing into the frit a predetermined quantity of zinc sulphide to impart a predetermined degree of opacity thereto and a predetermined quantity of zinc oxide to counteract any decrease in whiteness of the product that may have been brought about by said zinc sulphide.

8. As a new article of manufacture, an article glazed with a glaze made from the frit set forth in claim 7.

RAYMOND WILLIAM HANNAGEN.